Jan. 27, 1959 D. O. BENSON 2,870,616
COUPLING FOR CONNECTING ROTARY ELEMENTS SUCH
AS ROTARY MOWER BLADES WITH SOURCE OF POWER
Filed Oct. 8, 1957
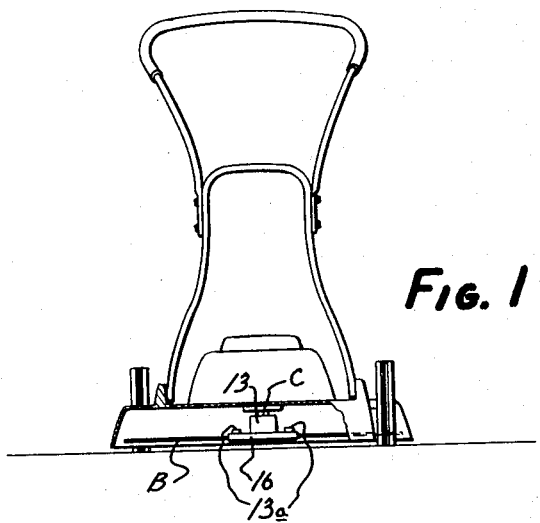
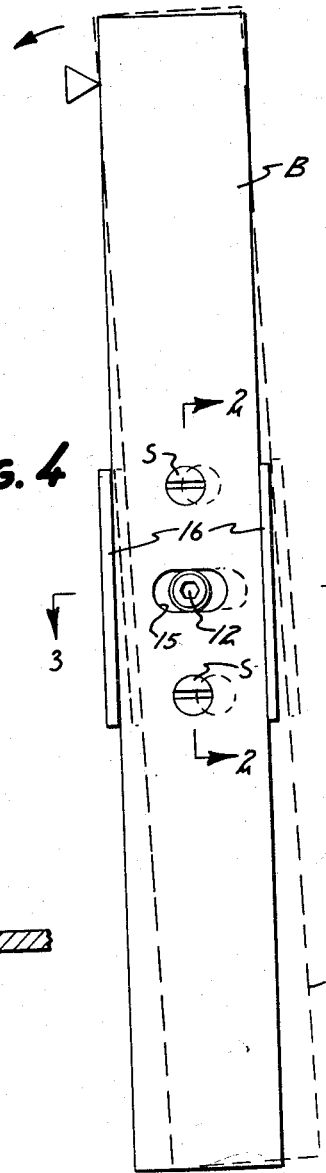
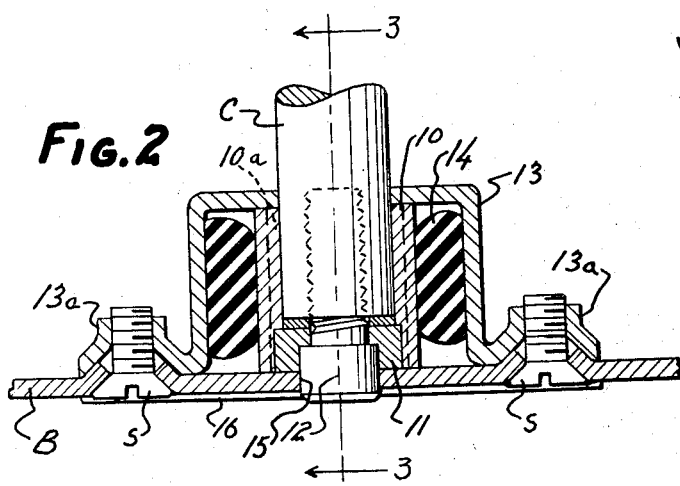
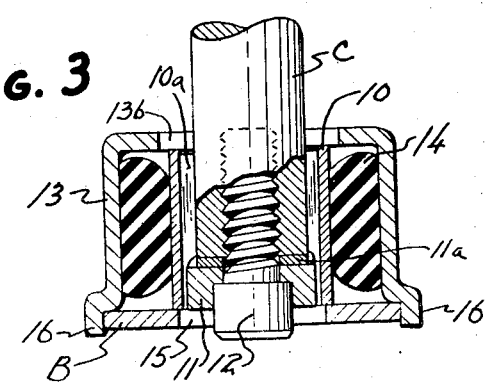
INVENTOR.
DONALD O. BENSON
BY Williamson, Schroder,
Adams & Mayer ATTYS.

United States Patent Office 2,870,616
Patented Jan. 27, 1959

2,870,616

COUPLING FOR CONNECTING ROTARY ELEMENTS SUCH AS ROTARY MOWER BLADES WITH SOURCE OF POWER

Donald O. Benson, Minneapolis, Minn., assignor to Toro Manufacturing Corporation, Minneapolis, Minn., a corporation of Minnesota Application October 8, 1957, Serial No. 688,972

6 Claims. (Cl. 64—27)

This invention relates to a novel coupling mechanism for attaching rotary elements such as lawn mower blades to the driving shaft of an engine to overcome serious objections inherent in conventional mechanisms now in use when the blade or driven rotary element encounters an object or obstruction.

At the present time, friction or torque-limiting coupling means are utilized in connection of the crank shaft of power mowers and the like with the rotary driven elements or blades providing some degree of protection from the standpoint of blade energy absorption and shearing of fly wheel keys and to some limited extent, protection from shifting of the crank shaft. Bending of the crank shaft however, when the driven rotary element encounters a fixed obstacle such as a stake or rock, is not averted.

Previous coupling devices have unwittingly resulted in angular deformation of the blade, resultant energy absorption (linear and twisting) in the entire mower assembly and bending or deformation of the crank shaft or rotary driving member.

It is an object of my present invention to provide a coupling of the class described for rotary mowers and the like wherein an elastic absorption of a deflecting force encountered when the driven element or rotary blade encounters an obstacle, becomes immediately effective, permitting transverse motion of the direct connection between driving and driven members but restraining blade and coupling from longitudinal motion or tilting and minimizing bending of the driven element and crank shaft of the motor. My new construction provides an accurately retained torsional flexibility of driven element or blade set at the factory and not subject to alteration by the user.

A further object is the provision of a coupling of the class described wherein provision is made for establishment of a new center of rotation upon the striking of the driven element or mower blade, with an obstacle or object without subjecting the crank shaft or driving element to critical bending strains or deformations and without causing angular deformation of the driven element or blade.

These and other objects and advantages of my invention will more fully appear from the following description made in connection with the accompanying drawings wherein like reference characters refer to similar parts throughout the several views and in which:

Fig. 1 is a view partly in front elevation and partly in vertical section showing a power lawn mower of the rotary type with my improved coupling between the motor crank shaft and rotary blade operatively employed;

Fig. 2 is a vertical section taken along the center line of the blade showing improved coupling mechanism;

Fig. 3 is another vertical section taken along the line 3—3 of Fig. 2; and

Fig. 4 is a bottom plan view of the blade and coupling and the confining channel for receiving the blade, the dotted lines showing the moved positions of the blade and holder immediately after encountering a sharp impact.

Referring to the drawings, my invention is applied as an efficient coupling between the power source such as the crank shaft of a small internal combustion engine and the rotary, two-armed blade of a power mower. It will of course be understood that while my coupling mechanism is particularly adapted for rotary mowers, it is also capable of wide general use where a rotary element subjected to impact and sudden strains or jolts, is connected for driving with a source of rotary power.

As shown in the drawings, particularly Fig. 1, the housing of a rotary mower is indicated as H, having mounted thereon the source of rotary power such as a small internal combustion engine or motor M having its crank shaft C extending vertically and medially of the housing H. The supporting wheels, push handle and other parts of the mower illustrated in part, are conventional and for the purpose of my invention, need not be further described.

In my coupling mechanism, a tubular metal core 10 surrounds crank shaft C and is keyed thereto by keys 10a and an underlying collar 11 with interposed frictional washer 11a is connected with the lower end of the shaft as by a threaded plug 12 received in a tapped bore of the shaft. The blade B of the rotary mower is rigidly affixed by a pair of spaced screws S to apertured, bossed portion 13a of an inverted compression cup 13 which loosely surrounds crank shaft C at its top and has a slot 13b provided in its top extending in the direction transverse to the length of the blade, as shown in Fig. 3. The peripheral wall of the compression cup 13 is spaced annularly and concentrically from the core 10.

An annular or doughnut-like cushion 14 surrounds core 10 and has its inner periphery affixed preferably by bonding to the cylindrical exterior of the core 10. Cushion 14 may be constructed of various compositions having elasticity and diametrical compressibility. Synthetic rubber compositions which are heat and oil-resistant are desirable, such as butadiene acrylonitrile. For motors within the range of 2 to 2½ horse power, I have found material of the class described having a hardness of approximately 60 durometer and reducible in diameter by approximately 20%, very effective for my purposes. The exterior periphery of the cushion 14 frictionally engages against the interior peripheral wall of the compression cup 13.

As shown, the compression cup has integrally formed therewith, elongated and depending ribs 16 which cooperate to define a channel, for receiving the blade B. The blade is provided with a central, transverse slot 15 having semi-circular ends, said slot being preferably about twice the diameter of the plug 12 in total length. The lower or headed portion of the plug 12 rides this slot, as clearly shown in Figs. 3 and 4.

In normal operation, torque is supplied from the crank shaft C through the medium of the slightly compressed, elastic cushion 14 bonded to the collar 10 and having external, frictional engagement with the interior wall of the compression cup 13.

When an object such as a rock or a stake is encountered by the rapidly revolving blade, as shown in Fig. 4, the entire blade and its holder including the channel formed by the rib 16 are moved transversely, immediately establishing a new center of rotation. In this action, the compressible cushion 14 yields sufficiently to permit the plug 12 to ride in slot 15.

In prior art structures, bent crank shafts are produced apparently from the combined torsional stress and planular angulation or beveling of the blade in encountering a relatively immovable object. With my improved coupling torsional strain is relieved by the frictional engagement of the external periphery of cushion 14 with the interior of the compression cup. Simultaneously, angular deformation of the blade along its longitudinal axis and also in a plane inclined or beveled to the normal horizontal position thereof, is greatly minimized by yieldability of the blade in its mounting structure transversely of the longitudinal center line thereof.

After the obstacle is passed, revolution of the blade causes proper recentering of the plug 12 within the middle of the transverse slot 15.

With my structure, the coupling and the setting of the blade is necessarily preformed at the factory. A user cannot reset or change the relationship as in prior art structures.

From the foregoing description it will be seen that I have provided a comparatively simple and economical coupling mechanism of the class described which positively overcomes serious objections to present conventional devices for interconnecting a source of rotary power with rapidly revolving elements such as the blades of a rotary mower.

It will of course be understood that various changes may be made in the form, details and arrangements of parts, all within the scope of my invention.

What is claimed is:

1. In a coupling for yieldably attaching a rotary driven element to a rotary driving element, a core structure non-rotatably connected with one of said elements, a generally annular elastic cushion surrounding said core, a compression cup structure surrounding said cushion and compressing the same diametrically, said cushion having a substantially cylindrical surface secured to one of said structures and having another substantially cylindrical surface frictionally engaging the other of said structures and said core member and compression cup being further interconnected to provide for limited shifting of said cup with yielding of said cushion in a general direction perpendicular to the axis of said driving element.

2. The structure set forth in claim 1 wherein said driven element constitutes a blade extending generally radially of said driving element and wherein said last mentioned connection is a slot and pin connection wherein the slot extends transversely of said blade and wherein the pin is connected to said core member.

3. A coupling for yieldably attaching a rotary element such as a lawn mower blade to the driving shaft of an engine comprising a compression cup spacedly surrounding said driving shaft and having fixed connections with said rotary element, a core non-rotatably connected for driving to said driving shaft, an annular elastic cushion surrounding said core and compressed diametrically by said cup and internally affixed to said core, the outer periphery of said cushion frictionally engaging the interior of said cup, said shaft having an axially disposed, projecting element and said driven rotary element having a slot therein confining said extension element, said slot extending transversely of said driven element.

4. The structure set forth in claim 3 wherein said driven element constitutes a rotary mower blade extending in both directions radially from the axis of said driving shaft and wherein said compression cup has spaced side portions extending perpendicularly to the length of said slot and constituting a channel for confining said blade.

5. A coupling for yieldably attaching a radially extending, rotary element such as a lawn mower blade to the driving shaft of an engine comprising, an inverted compression cup spacedly surrounding said driving shaft and having fixed connection with said radially extending rotary element, an annular, compressible elastic cushion disposed within said cup and compressibly interposed between the internal wall of said cup and said shaft, the internal wall of said annular cushion being fixedly connected with said shaft and the outer periphery of said cushion frictionally engaging the interior of said cup and cooperating means interconnecting said shaft and said rotary, radial element for permitting limited shifting of the axis of said shaft relative to said rotary element in a line transversely of the length of said element while preventing shifting of the axis of said shaft longitudinally of said element.

6. The structure set forth in claim 5 wherein said cooperating means comprises a transverse confining slot formed in the attached end of said rotary element and extending transversely to the length thereof and a projecting pin member secured to the connected end of said shaft and projecting axially therefrom, said pin being confined in said slot and having limited movement therein transversely of said rotary element when an obstruction is encountered by a longitudinal edge of said rotary element.

References Cited in the file of this patent

UNITED STATES PATENTS

| | | |
|---|---|---|
| 2,554,311 | Place | May 22, 1951 |
| 2,727,368 | Morton | Dec. 20, 1955 |
| 2,803,103 | Kollman | Aug. 20, 1957 |